United States Patent [19]
Honigsbaum

[11] Patent Number: 5,331,918
[45] Date of Patent: Jul. 26, 1994

[54] TACTIOVISUAL EXIT FINDING SYSTEM FOR AIRCRAFT CABINS AND THE LIKE

[76] Inventor: Richard F. Honigsbaum, A-21 Barry Gardens, 245 Passaic Ave., Passaic, N.J. 07055

[21] Appl. No.: 4,716

[22] Filed: Jan. 14, 1993

[51] Int. Cl.⁵ .............................................. G08B 1/00
[52] U.S. Cl. .......................... 116/205; 116/DIG. 17
[58] Field of Search .................. 116/205, DIG. 17; 340/407; 182/18, 230

[56] References Cited

U.S. PATENT DOCUMENTS

| | | | |
|---|---|---|---|
| 4,029,994 | 6/1977 | Iwans | 340/331 X |
| 4,347,499 | 8/1982 | Burkman, Sr. et al. | 340/286.02 X |
| 4,385,586 | 5/1983 | Schriever | 116/205 |
| 4,401,050 | 8/1983 | Britt et al. | 116/205 |
| 4,737,764 | 4/1988 | Harrison | 340/332 X |
| 4,754,266 | 6/1988 | Shand et al. | 340/332 X |
| 4,794,373 | 12/1988 | Harrison | 340/332 X |
| 5,027,741 | 7/1991 | Smith et al. | 116/205 |

FOREIGN PATENT DOCUMENTS 0874554  6/1971  Canada .................... 116/205

OTHER PUBLICATIONS

14 CFR 25.811(c), pp. 351-353; Federal Aviation Administration, DOT.
14 CFR 25.777(g), pp. 340-342; Federal Aviation Administration, DOT.

*Primary Examiner*—William A. Cuchlinski, Jr.
*Assistant Examiner*—W. Morris Worth
*Attorney, Agent, or Firm*—Cohen, Pontani, Lieberman, Pavane

[57] ABSTRACT

A tactiovisual exit finding system is provided with a collection of tactiley and visually recognizable vees to direct occupants of structures, such as aircraft and public buildings, to the nearest appropriate exits. Since these vees are recognizable by touch and sight, they are effective at any level of visibility including the smoke-compromised equivalent of total darkness. These vees are incorporated into the main aisle and exit passageway floors of such structures where they are tactiovisually addressable by persons walking, crawling, or anything in between. The system also utilizes tactiovisually distinctive upholstery on the seats that flank exit passageways to further identify such passageways.

33 Claims, 5 Drawing Sheets

TACTIOVISUAL EXIT FINDING SYSTEM FOR AIRCRAFT CABINS AND THE LIKE

BACKGROUND OF THE INVENTION

1. Field of the Invention

This invention relates to exit finding systems and more particularly to exit finding systems that are both tactilely and visually effective when illumination is adequate and tactilely effective when it is not.

2. Prior Art

The exit finding systems of present commercial aircraft are the overhead and exit-proximal signs and the floor lighting, the latter intended to satisfy 14 CFR 25.811(c), "Means must be provided to assist the occupants in locating the exits in conditions of dense smoke.", when the former are obscured by that smoke. While floor lighting clearly addresses situations in which the signs are obscured by smoke but the floor lighting is not, it clearly fails to address situations in which the floor lighting is obscured by smoke, eye irritation, or visual impairment, or in which the floor lighting system itself fails.

Thus any self-guiding system expected to be effective both when vision is compromised and when it is not must also invoke some other sense, and such systems are found in facilities for the blind, where tactiovisual aids abound, and tactiovisual lavatory signs, to cite one example, serve the blind tactilely and the sighted visually. Such aids, however, are not intended for, and will not effectively serve persons whose vision is compromised by eye irritants and smoke, and who must find an exit while crawling "on all fours" in an attempt to get below the heaviest concentrations of smoke and toxic gases, and must find that exit before these gases take their deadly toll.

Tactiovisual aids are also familiar items in aircraft cockpits, where critical knobs, switches, actuators and controls are so coded in the hope of preventing a catastrophe caused by a pilot inadvertently "pressing the wrong button". Tactiovisual exit finding aids are not found in aircraft cabins, however, although such aids could save lives by facilitating evacuation when vision dependent exit finding aids are obscured by smoke.

SUMMARY OF THE INVENTION

According to the present invention I have developed passive tactiovisual exit finding systems that are both tactilely and visually effective when illumination is adequate and tactilely effective when it is not.

According to a first preferred embodiment of the invention, the floors of the passageways to the exits in an aircraft cabin have passive tactiovisual exit passageway identifiers that are spaced arrays of vea-shaped strips that are both tactilely and visually distinguishable from the flooring or floor covering material between them. These arrays protrude a part of the way into the main passenger aisle so that passengers in that aisle can find these protruding parts, and thus the exits, by sight where possible, and by touch otherwise. The apices of the vees point toward the exits to confirm direction, and the exit passageway identifiers protrude only part of the way into the main aisle to avoid ambiguity with respect to direction when exits are at opposite ends of the same rows.

According to a second preferred embodiment of the invention, the main passenger aisle also has a spaced array of vee-shaped strips that are both tactilely and visually distinguishable from the flooring or floor covering material between them. The apices of these main aisle vees point the way to the nearest appropriate exit, and facilitate evacuation by making clear the direction to that exit.

According to a third preferred embodiment of the invention, the parts of exit passageway flanking seats that face these passageways are upholstered in a material tactiovisually distinguishable from the other upholstery in the aircraft, making these seats and the passageways they flank visually identifiable from just about any part of the passenger cabin when conditions are right, and locatable by touch alone otherwise.

The tactiovisual exit finding system of this invention has advantages over the prior art, the most important of which is an exit finding system that is effective at any level of vision including the smoke-compromised equivalent of total darkness. Because it is effective at any level of vision, it also serves the visually impaired regardless of the level of impairment.

A second important advantage of the exit finding system of this invention is its universality. Anyone who can follow the vees can find the exits in any structure having the system.

A third important advantage of the exit finding system of this invention is its cost effectiveness. Since seats are upholstered and floors have flooring or floor covering material anyhow, the incremental cost of upholstering seats and installing floors or floor covering material in accordance with this invention when aircraft or other structures are built or refurbished is negligible. Further, because the system is a passive one that is maintained by normal cleaning operations, incremental maintenance costs are nil.

Another important advantage of the exit finding system of this invention is its compatibility with, and its complementarity with respect to, prior art exit finding systems. These prior art systems of overhead signs and floor-based illumination are complemented by the tactiovisual exit passageway seats and identifiers and the tactiovisual main aisle guide strips of the present invention, and these main-aisle-centered guide strips are compatible with the prior art floor-based illumination which is typically strip lighting offset with respect to the center of the main aisle.

These, as well as other features, modifications, and advantages of the tactiovisual exit finding systems of the present invention will now be more fully described with reference to the annexed drawings of the preferred embodiments thereof.

DETAILED DESCRIPTION OF THE PREFERRED EMBODIMENTS

Figure 1:
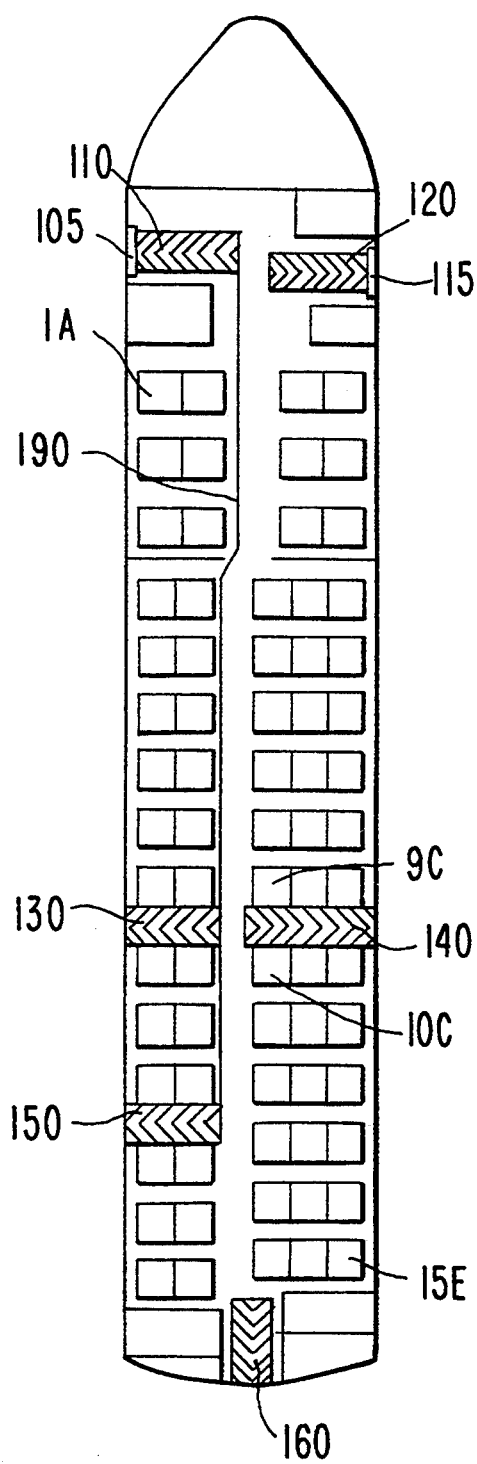
FIG. 1 is a plan view of the interior of the cabin of a hypothetical passenger aircraft illustrating the floor-based tactiovisual exit passageway identifiers in accordance with the present invention.

The embodiment of FIG. 1 is a hypothetical commercial passenger aircraft, and the drawing shows not only the seating arrangement for such an aircraft, but also the minimal preferred tactiovisual exit finding system of this invention.

Passenger seats for this hypothetical aircraft, shown as squares in the drawing, all face forward and are identified conventionally, so that the first seat in the first now is seat 1A and the last seat in the last row is seat 15E as shown. Emergency evacuation of this hypothetical aircraft is via passenger emergency exits at the port and starboard ends of the passageways between seat rows 9 and 10, at the port end of the passageway between seat rows 12 and 13, at the tail cone exit, and also, of course, via the port and starboard forward passenger entrance doors 105, 115.

This invention is intended to facilitate safe and rapid evacuation of aircraft under conditions of cabin visibility ranging from normal to the smoke-impaired equivalent of total darkness, and does so by means of the floor-based tactiovisual exit passageway identifiers 110, 180, 130, 140, 150, and 160, each serving one of the previously mentioned exits. Each of these passageway identifiers, preferably an integral part of the cabin floor covering (or the floor itself if that floor is left uncovered), or alternately mat-like and attached to that floor, is preferably an array of straight legged 90 degree apex angle vees, the spices of which point to their respective exits as shown. These vees are, of course, the tactiovisual elements of these passageway identifiers, and are preferably made more recognizable visually by color and shade selection that not only maximizes the visual contrast between the vees and the spaces between them, but also the contrast between these identifiers and the adjacent portions of the cabin floor.

These vees are also the tactile elements of the passageway identifiers, and are preferably made more recognizable tactilely by vee surfaces the textures of which are rough enough to be recognized not only with the bare hand, but also through a shoe. Because the tactile features of this invention become more important than the visual ones under the smoke conditions previously mentioned (or for a passenger that is visiually impaired), tactile contrast between the vees and the spaces between them, and between the passageway identifiers and other tactilely addressable portions of the floor is also preferably maximized. Floor treatments that are tactiovisually effective for purposes of this invention are considered further in the description of FIG. 5.

Returning to FIG. 1, floor-based tactiovisual exit passageway identifiers 110, 120, 130, 140, and 150 are shown protruding part of the way into the main aisle, an arrangement that is preferred because it makes them easier to find. Further, a well-defined space, preferably at least the width of a shoe, has been left between the inboard ends of identifiers 110, 120, and also between the inboard ends of identifiers 130, 140. These spaces eliminate the confusion with respect to which way to turn that could otherwise occur when vision is compromised and a passenger finds abutting identifiers with his hand or his foot, and is preferably included where appropriate in all embodiments of this invention.

Figure 2:
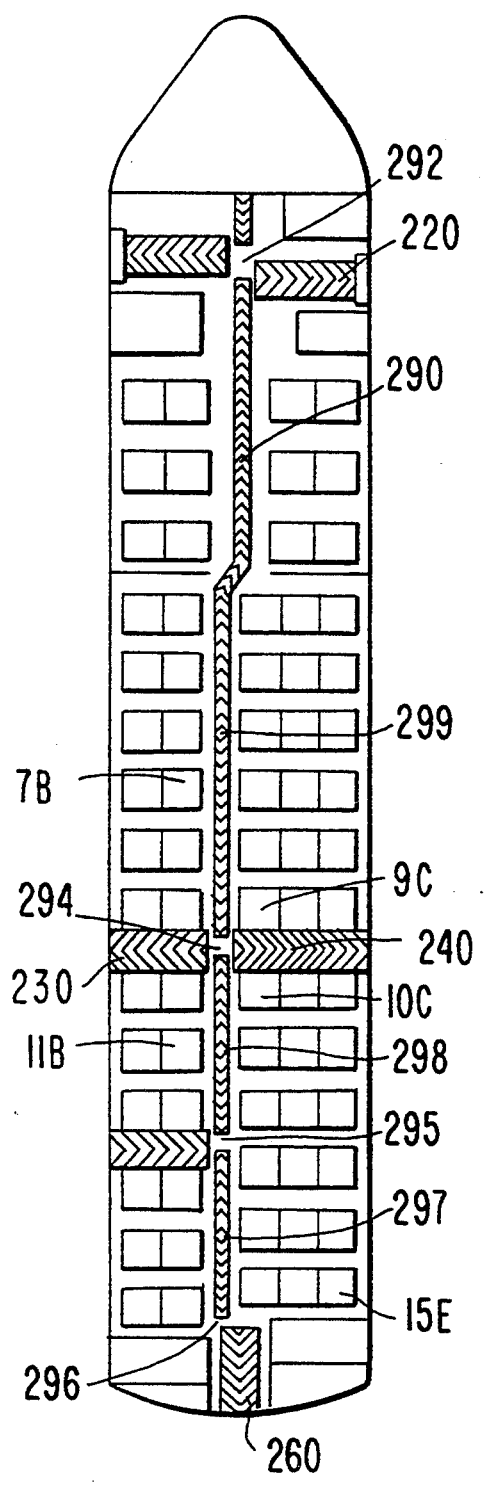
FIG. 2 is a plan view of the interior of the cabin of a hypothetical passenger aircraft illustrating the floor-based tactiovisual exit passageway identifiers and the floor-based tactiovisual main aisle guide strips in accordance with the present invention.

The embodiment of FIG. 2 is a hypothetical commercial passenger aircraft having not only the minimal preferred tactiovisual exit finding features of FIG. 1, but also a floor-based tactiovisual main aisle guide strip 290 that, along with the appropriate floor-based tactiovisual exit passageway identifier, leads a passenger directly from his seat row to the nearest appropriate exit.

As a first example of this consider the passenger in seat 15E. Assuming adequate lighting, this passenger will see the aft pointing vees of guide strip 290 (or some other exit markers) and follow them to tail cone exit passageway identifier 260 and thus to the tail cone exit. Under conditions approaching zero visibility that passenger would feel for guide strip 290, check the vees to confirm direction to the nearest appropriate exit, and walk or crawl to the aft end of quids strip 290 where gap 296 marks the inboard end of identifier 260, and thus a direct passageway to the tail cone exit.

Next consider the passenger in seat 78. Under conditions approaching zero visibility this passenger too would feel for guide strip 290, check the vees to confirm direction to the nearest appropriate exit, and walk or crawl aft along the strip to gab 294, which marks the inboard ends of the pair of exit passageway identifiers 230, 240. Here, however, the identifiers and their corresponding direct passageways to exits are perpendicular to the guide strip, and the passenger is led to discover one or the other of these pasageways rather than the continuation of guide strip 290 by making gap 294 long and the distance from the guide strip to the exit passageway identifiers short.

Guide strip 290 also has additional gaps 292 and 295, and it should now be clear from this description and the drawing that exit passageway identifiers can be found at gaps in the main aisle guide strip of the hypothetical aircraft of FIG. 2, a convention that is preferably retained when practicing this invention.

Now consider the passengers in seat now 11. These passengers are substantially the same distance from the nearest exit forward that they are from the nearest exit aft and could use either one, but because these passengers would know that those in the row immediately forward are exiting directly from that now in an emergency and would want to follow suit, they are directed to the emergency exit immediately forward. To accommodate this, passengers entering the main aisle from seat row 11 find at their feet guide strip vees pointing forward. Passengers in seat row 12 are closer to the nearest exit aft, however, and are directed to that exit by the aft-pointing guide strip vees they find at their feet as they enter the main aisle.

Since the guide strip vees must change direction to serve the passengers in both seat now 11 and seat now 12, it is clear that in lieu of gaps, which serve the purpose mentioned earlier, vees will abut to form the diamond pattern 298. The other "diamonds", 297 and 299, are explained analogously. While the "diamonds"

in the hypothetical aircraft of FIG. 2 have been positioned on the basis of reasoning alone, actual positioning for a real or planned aircraft would, of course, be confirmed by evacuation drills.

Figure 3C:
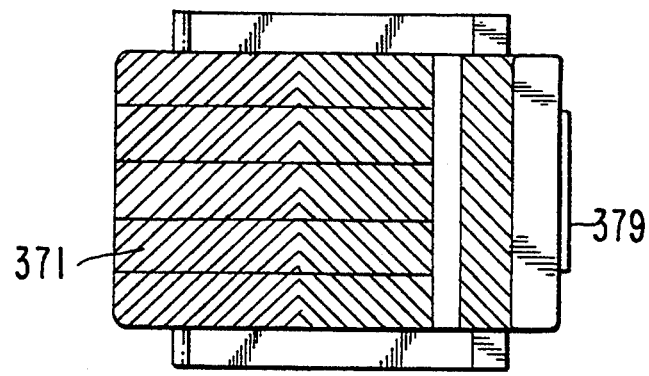
FIG. 3C is a plan view from above of the seat of FIG. 3A.
Figure 3B:
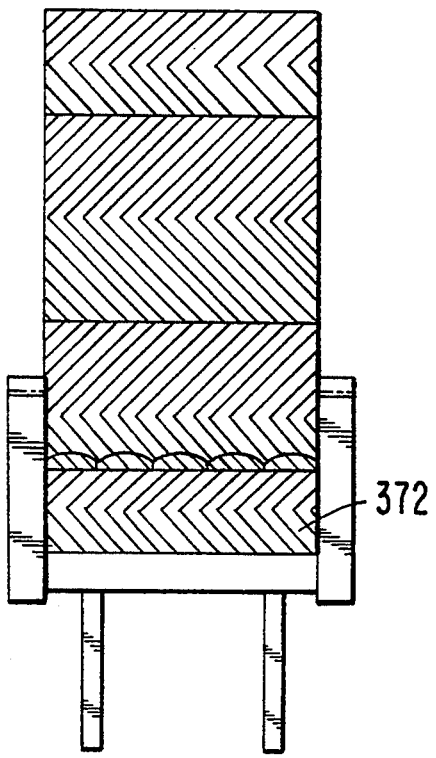
FIG. 3B is a front elevational view of the seat of FIG. 3A.
Figure 3A:
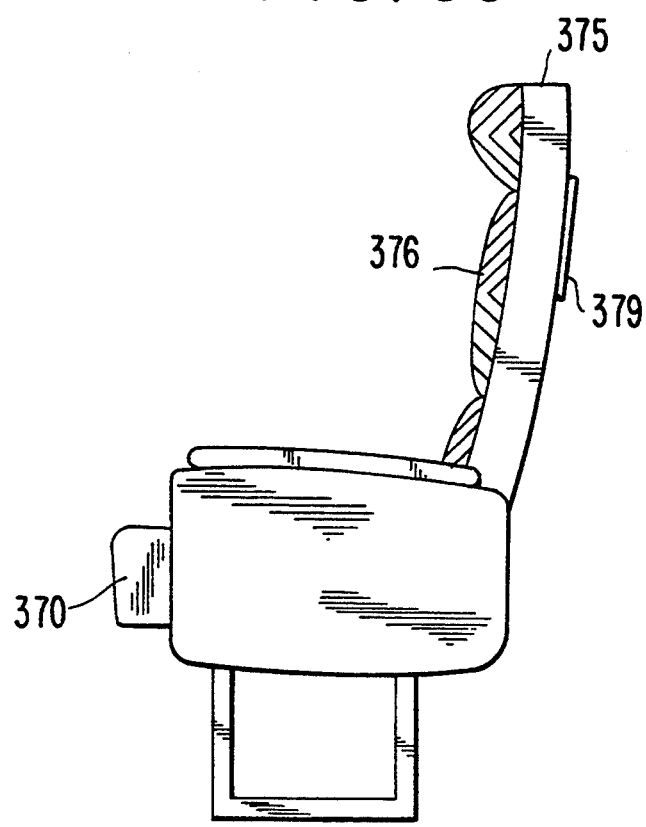
FIG. 3A is a side elevational view of the aisle side of an aisle seat facing an exit passageway and in accordance with the present invention.

The embodiment of FIG. 3 is the aisle seat in an exit now, say seat 10C in FIGS. 1 and 2; FIG. 3A being that seat as viewed from the aisle, FIG. 3B that seat as viewed from the passageway leading to the exit, and FIG. 3C that seat as viewed from above. As is clear from these drawings, substantially all portions of the seat tactiovisually addressable from that passageway, the top 371 and front 372 of seat cushion 370, and the front portion 376 of seat back 375, are covered in a suitably fire-resistant tactiovisually distinctive material that makes it immediately recognizable as an exit row seat. One example of such a material is distinctively colored wide wale corduroy cut and sewn to form the now familiar vees that, like those of the floor-based tactiovisual exit passageway identifiers, point the way to the exit. Where leather is the seat covering material of choice, seats can be made tactiovisually distinctive by selective sueding, stitching, patching, dyeing, embossing, etc.

Figure 4C:
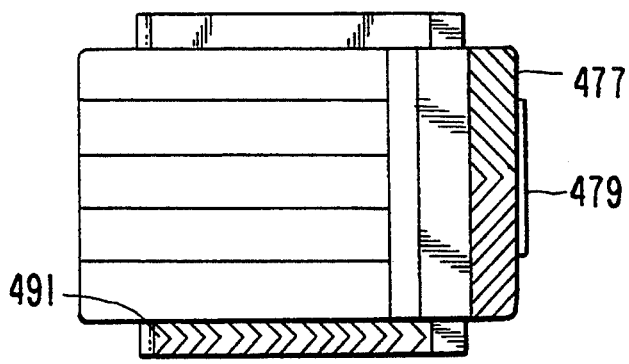
FIG. 4C is a plan view from above of the seat of FIG. 4A.
Figure 4A:
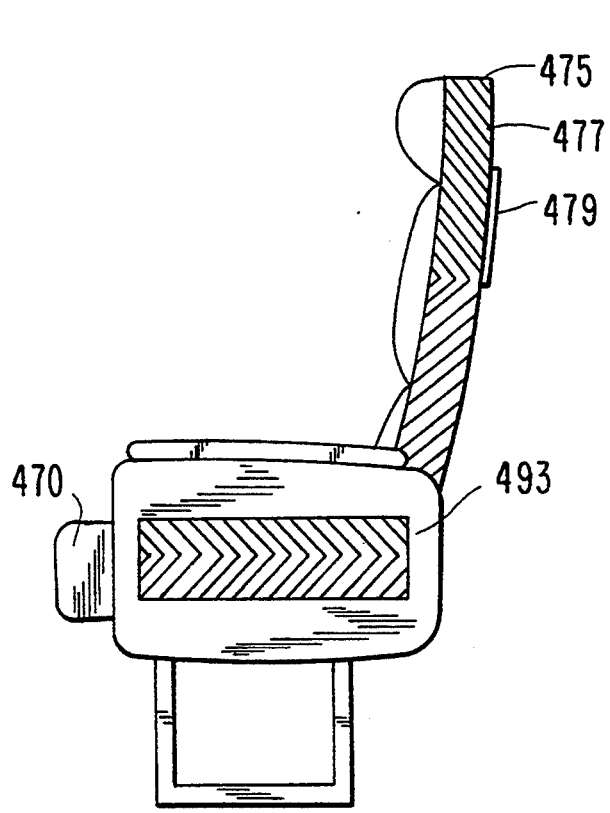
FIG. 4A is a side elevational view of the aisle side of the exit passageway seat opposite the seat of FIG. 3A and in accordance with the present invention.
Figure 4B:
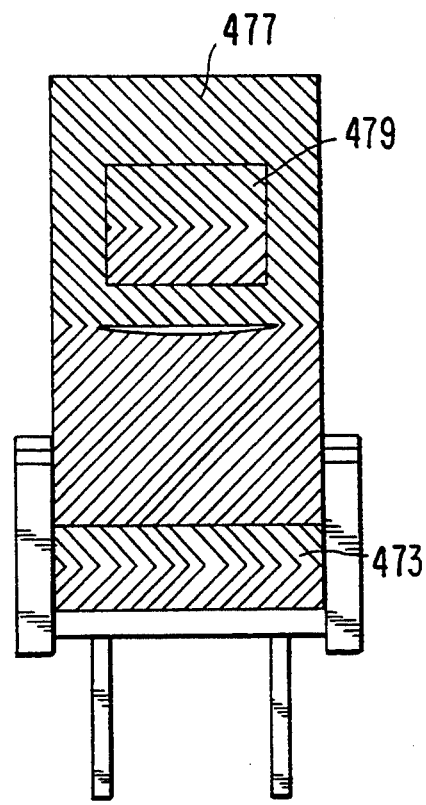
FIG. 4B is a rear elevational view of the seat of FIG. 4A.

The embodiment of FIG. 4 is an aisle seat the back of which faces a passageway to an exit, say seat 9C in FIGS. 1 and 2; FIG. 4A being that seat as viewed from the main aisle, FIG. 4B that seat as viewed from that passageway, and FIG. 4C that seat as viewed from above. This seat, like the seat of the FIG. 3 embodiment, also flanks the inboard end of a passageway to am exit, and here too, as in the FIG. 3 embodiment, substantially all portions of the seat that are tactiovisually addressable from that passageway are covered in a suitably fire-resistant tactiovisually distinctive material, preferably the same material as are the passageway-addressable portions of the embodiment of FIG. 3. Accordingly, the back 477 of seat back 475 and the adjoining part 473 of seat cushion 470 are shown so covered in the drawings.

Tray table 479, shown in its stowed position in the drawings, is also tactiovisually addressable from that passageway, and it too is shown with the now familiar vees on its face. This face, say a suitably fire-resistant plastic laminate, is preferably colored and textured to mimic the look and feel of the guide strips and the exit passageway identifiers, but with the texture effected by embossing rather than the other ways mentioned in the description of FIG. 5 to preserve the sanitary properties of the laminate. Tray tables for all the other passenger seats, say tray table 379 of FIG. 3A for example, are also preferably so faced as well, their vees, of course, pointing the way to the nearest exit.

While the descriptions of FIGS. 3 and 4 have been directed toward two specific seats, this special treatment is preferably accorded all of the seats flanking a passageway to an exit and, when all such seats are so upholstered, virtually any passenger at any seat can spot not only the nearest exit, but also an alternate one. When an aircraft with seats so upholstered also includes the tactiovisual exit passageway identifiers of FIG. 1, that aircraft becomes one in which passengers walking, crawling on all fours, or anything between, and under visual conditions ranging from normal to the smoke-compromised equivalent of total darkness, can find the exits on their own.

When these passengers choose their respective exits and the paths to them on their own, they can, however, make choices that upset the smooth flow of traffic that is the heart of any effective evacuation plan. This compromised traffic flow and the resulting increase in evacuation time is addressed by the directional tray tables and main aisle guide strips that tell passengers both at their seats and in the aisle which way to go. These table tops and guide strips direct passengers to exits assumed usable however, and passengers directed toward exits that are blocked will, of course, require special attention. This attention is provided by flight attendants freed for the task by passengers that are adequately served by these directional elements and can get by on their own.

The directional information supplied by the tray tables and the main aisle guide strips can also be displayed elsewhere, say on the armrests of aisle seats where, as in FIG. 4C, it is shown displayed on the upper portion 491 of the aisle side armrest, or on the aisle side panels of aisle seats where, as in FIG. 4A, it is shown displayed as a strip 493 on that panel. When directional information is displayed on the armrests or side panels as shown, it is preferably displayed in the same way as on the tray tables, and for the same reasons.

Figure 5:
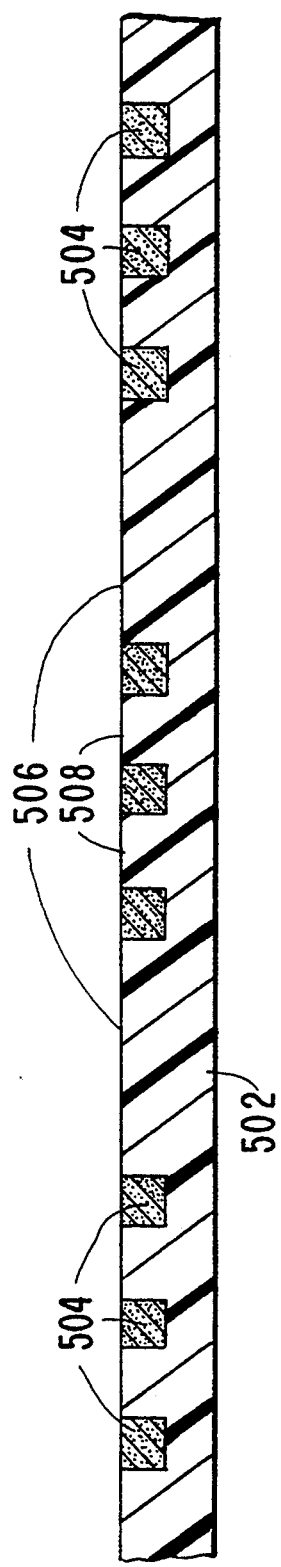
FIG. 5 is a sectional view of the flooring or floor covering material that becomes the tactiovisual exit passageway identifiers and main aisle floor strips of the present invention.

FIG. 5 is a sectional view of an otherwise conventional aircraft floor covering material that has been modified to become the preferred floor-based tactiovisual exit passageway identifiers and guide strips of this invention. As shown in the section, taken normal to the legs of the vees of these identifiers or strips, conventional aircraft cabin floor covering material 502, preferably having a color that is lighter than, and a good color and shade contrast with, the rest of the cabin floor, is grooved or otherwise modified to accommodate strips of abrasive material 504. These abrasive strips, say silicon carbide grains in a suitable binder and preferably dark enough for good visual contrast with respect to both the material 502 and the rest of the floor, are preferably put into the embodiment of FIG. 5 at the time of manufacture, or alternately, pressed, cast, or cemented into the previously mentioned grooves later, say when the floor covering material is installed.

Abrasive strips 504 are preferably arranged in clusters, say the groups of three shown, between which are wider strips 506 of material 502, an arrangement that helps to emphasize the vee pattern. In the preferred embodiment the shades and colors of the cabin floor, the abrasive strips 504, and the material 502 which, in some aircraft, might be metal, would, of course, be those that best facilitate evacuation under emergency lighting conditions.

Exit passageway identifiers and guide strips in accordance with FIG. 5 are preferred to those in which the vees are tactiovisually defined by selective modification of the floor or the floor covering material alone, say by embossing, ribbing, grooving, or, where carpeting is required, by sculpturing, or even by imitations of FIG. 5 in which the abrasive strips are aircraft quality versions of the anti-slip strips intended for boats or bathtubs, because these other embodiments become less effective for the purposes of this invention as a result of wear, while the FIG. 5 embodiments become more so. Thus the abrasive strips 504 become more tactilely recognizable as the softer material that surrounds them is worn away, and that wear also purges the surface of softer material 502 of contaminants that would otherwise compromise visual recognition. These contaminants darken the abrasive strips too, but because these abrasive strips are not as effectively purged of contaminants by wear, visual contrast is further enhanced.

The alternating strips of abrasive material 504 and the wide or narrow strips of floor covering material 506, 508 of the embodiments of FIG. 5 are, of course, the vees of the floor-based tactiovisual exit passageway identifiers and main aisle guide strips and, as mentioned, these vees preferably have straight legs and right apex angles, and are oriented as shown in FIGS. 1 and 2 to lead passengers to their nearest appropriate exits.

This particular yes configuration and orientation is preferred because it serves its intended purpose most effectively. Straight legged vees are, for example, much easier to recognize tactilely than are curved legged vees or arrows, and the directionality inherent in a well-defined apex angle is lost when these angles approach zero or 180 degrees. Further, the legs of the vees make a 45 degree angle with respect to the direction of travel from a seat aisle to a main aisle, along a main aisle, from a main aisle to a passageway to an exit, and along that passageway, making the legs of the vees not only easy to recognize tactilely along the path from a seat to an exit, but also easy to distinguish from the scores and grooves made by defective food and beverage cart wheels, cleaning equipment, luggage, etc., or those intentionally introduced to mask such wear.

Thus the preferred embodiments of the key features of this passive tactiovisual exit finding system; the floor-based exit passageway identifiers, the seats that flank the exit passageways, the main aisle directional strips, and the directional tray tables have been described. While these features satisfy 14 CFR 25.811(c) in a way that no active a way system dependent upon lights, power supplies, and vision alone can, it should be noted that the directional table tops and aisle strips appear to violate the bidirectional implications of 14 CFR 25.812(e) (1). This apparent violation can, of course, be addressed, say by replacing the chain of vees with a chain of bidirectional tactiovisual elements such as the "diamonds" of FIG. 2, or simply by changing the vees into straight lines, but a far better approach would be the staging of evacuation drills to find out which configuration works best.

While the examples used to describe the key features of this invention are the hypothetical aircraft of FIGS. 1 and 2, these features are also applicable not only to aircraft having two main passenger aisles and to those having exit passageways at consecutive rows of seats, but also to land vehicles such as those used to transport the visually handicapped, to trams or trains that run in tunnels, to windowless structures such as bomb shelters, theaters, etc.

With respect to aircraft, and using as examples FIGS. 1 and 2, if a second pain of exit passageways were introduced between seat rows 8 and 9, the seats of row 8 would be covered in accordance with FIG. 4, while the seats of now 9, which would have exit passageways at both front and back, would still look like FIG. 4 seats from the back, but would be further modified to look like FIG. 3 seats from the front. For aircraft having two main aisles, the drawings for such aircraft corresponding to the present FIGS. 1 and 2 would be mirror-symmetrical versions of these drawings, with the plane of reflection say between seat columns D and E and, of course, with exit passageway identifiers 120, 140, 160, 220, 240, 260 and their corresponding exits omitted.

The tactiovisual exit finding system of this invention is not only applicable to virtually any passenger aircraft; it is also "universal" in the sense that anyone who can follow the vees can find the exits in any structure having this system and will be able to do so despite language or literacy problems, visual impairment, etc., but only if tactiovisual exit finding elements in the structure were recognizable as such. Thus vees that fluoresce and are illuminated to make them do so would be so recognizable, while tactiovisual exit finding systems in which the tactile parts are "bathtub" anti-slip strips stuck to the floor alongside aircraft passenger cabin floor lighting (the light strips of which are visually recognizable even when the lights are off) might not be so recognizable even though they are within the scope of this invention as defined by the claims.

The floor lighting of the prior art can, however, complement the tactiovisual exit finding systems of this invention without compromising either. In FIG. 1, for example, light strip 190 is shown bisecting the vees of tactiovisual exit passageway identifier 150, flanking the vees of identifier 130, and on the aft side of identifier 110. To avoid confusion, however, only one of these lighting-identifier arrangements would be used in practicing this invention.

FIG. 1 also shows the lighting strip offset with respect to the center of the main aisle as are these strips in most aircraft. While this offset readily accommodates a main aisle centered guide strip like the one in FIG. 2, floor lighting corresponding to light strip 190 of FIG. 1 has been omitted from FIG. 2 for clarity of illustration.

In practicing the present invention in structures such as aircraft where panic bars are inappropriate and exit closure locking mechanisms are released by handles, tactiovisual vee arrays can also be used to guide hands to these handles, and as adjuncts to, or possible replacements for, the arrows of 14 CFR 25.811(e) (4).

Vee arrays might also be appropriate adjuncts to, or replacements for, conventional wording on exit signs in structures where the present invention is practiced.

Since these as well as other variations and modifications are within the scope of the present invention, descriptions contained herein should be considered illustrative rather than limiting.

In both these descriptions and the claims that follow, the term "tactiovisual" refers to an object or objects identifiable by touch or sight, and the terms "exit passageway" or simply "passageway" refer to the passageway to, but not necessarily through, an exit.

I claim:

1. A system for finding an exit passageway in a structure having a plurality of fixed seats arranged in rows served by at least one main aisle and at least one exit served by an exit passageway, said system comprising:
a passive tactiovisual exit passageway identifier having a plurality of passive unidirectional tactiovisual means for both singly and collectively and both tactilely and visually identifying a direction to said at least one exit.

2. The exit passageway finding system of claim 1, wherein the direction identified by said passive unidirectional tactiovisual means is discernible through a shoe.

3. The exit passageway finding system of claim 1, wherein said exit passageway identifier is floor based and protrudes into said at least one main aisle.

4. The exit passageway finding system of claim 1, wherein said passive unidirectional tactiovisual means comprises alternating vee-shaped strips of abrasive material and similarly shaped strips of at least one of flooring and floor-covering material arranged between adjacent ones of alternating vee-shaped strips of abrasive material embedded into at least one of a tactiovisually contrasting flooring and tactiovisually contrasting floor-covering material.

5. The exit passageway finding system of claim 4 wherein said alternating vee-shaped strips of abrasive material are arranged in a nested configuration.

6. The exit passageway finding system of claim 1, further comprising floor-based electric illumination means for providing illumination at least a portion of which is in illuminative proximity to said passive tactiovisual exit passageway identifier.

7. A system for finding an exit passageway in a structure having a plurality of fixed seats arranged in rows served by at least one main aisle and at least one exit served by an exit passageway, said system comprising:
an exit-passageway-floor-based passive tactiovisual exit passageway identifier and a main-aisle floor-based passive tactiovisual main aisle guide strip both having a plurality of passive unidirectional tactiovisual means for both singly and collectively and both tactilely and visually identifying a direction to said at least one exit.

8. The exit passageway finding system of claim 7, wherein the direction identified by said passive unidirectional tactiovisual means is discernible through a shoe.

9. The exit passageway finding system of claim 1, wherein said exit passageway identifier protrudes into said at least one main aisle.

10. The exit passageway finding system of claim 7, wherein said passive unidirectional tactiovisual means comprises alternating vee-shaped strips of abrasive material and similarly shaped strips of at least one of flooring and floor-covering material arranged between adjacent ones of said abrasive material said alternating vee-shaped strips of abrasive material embedded into at least one of a tactiovisually contrasting flooring and tactiovisually contrasting floor-covering material.

11. The exit passageway finding system of claim 7, wherein at least one of said seats flanks said exit passageway, wherein a portion of said flanking seat comprises upholstery having a plurality of passive unidirectional tactiovisual upholstery means for both singly and collectively identifying a direction to said at least one exit and identifying said flanking seat as a seat flanking an exit passageway.

12. The exit passageway finding system of claim 7, wherein at least one of said fixed seats flanks said at least one main aisle and said at least one main-aisle-flanking seat has an aisle-side armrest at least a portion of which has a plurality of passive unidirectional tactiovisual strip means for both singly and collectively and both tactilely and visually identifying the direction to said at least one exit.

13. The exit passageway finding system of claim 7, wherein at least one of said fixed seats flanks said at least one main aisle and said at least one main-aisle-flanking seat has an aisle-side side panel at least a portion of which has a plurality of passive unidirectional tactiovisual strip means for both singly and collectively and both tactilely and visually identifying the direction to said at least one exit.

14. The exit passageway finding system of claim 7, wherein at least one of said fixed seats is served by a tray table at least a portion of which has a plurality of passive unidirectional tactiovisual embossed means for both singly and collectively and both tactilely and visually identifying the direction to said at least one exit.

15. The exit passageway finding system of claim 7, further comprising floor-based electric illumination means for providing illumination, said illumination means being arranged along at least a portion of said at least one main aisle and in illuminative proximity to said exit passageway identifier.

16. A system for finding an exit passageway in a structure having a plurality of fixed seats arranged in rows served by at least one main aisle and at least one exit served by an exit passageway, said system comprising:
at least one seat flanking said exit passageway, a portion of said flanking seat comprising upholstery having a plurality of passive unidirectional tactiovisual means for both singly and collectively and both tactilely and visually identifying a direction to said exit and for identifying said flanking seat as a seat flanking an exit passageway.

17. The exit passageway finding system of claim 16, wherein said upholstery is a waled fabric cut and sewn to provide the passive unidirectional tactiovisual means for identifying the direction to said exit.

18. The exit passageway finding system of claim 16, wherein said upholstery comprises at least one of a leather and leather-like material selected portions of which are at least one of sueded, stiched, patched, embossed, and dyed to provide said passive unidirectional tactiovisual means for identifying the direction to said exit.

19. The exit passageway finding system of claim 16, further comprising passive unidirectional tactiovisual exit-passageway-floor-based means for identifying said exit-serving exit passageway.

20. The exit passageway finding system of claim 16, further comprising passive unidirectional tactiovisual main-aisle-floor based means for identifying said exit-serving exit passageway.

21. A system for finding an exit passageway in a structure having a plurality of fixed seats arranged in rows served by at least one main aisle and at least one exit served by an exit passageway flanked by at least one flanking seat of said rows of fixed seats, said system comprising:
(a) passive unidirectional tactiovisual exit-passageway-floor-based means for identifying said exit-serving passageway;
(b) passive unidirectional tactiovisual main-aisle-floor-based means for identifying said exit-serving exit passageway; and
(c) passive unidirectional tactiovisual seat-based means for identifying said at least one flanking seat as a seat flanking an exit passageway.

22. The exit passageway finding system of claim 21, wherein at least one of said fixed seats flanks said at least one main aisle and said at least one main-aisle-flanking seat has an aisle-side armrest at least a portion of which has a plurality of passive unidirectional tactiovisual strip means for both singly and collectively and both tactilely and visually identifying the direction to said at least one exit.

23. The exit passageway finding system of claim 21, wherein at least one of said fixed seats flanks said at least one main aisle and said at least one main-aisle-flanking-seat has an aisle-side side panel at least a portion of which has a plurality of passive unidirectional tactiovisual strip means for both singly and collectively and both tactilely and visually identifying the direction to said at least one exit.

24. The exit passageway finding system of claim 21, wherein at least one of said fixed seats is served by a tray table at least a portion of which has a plurality of passive unidirectional tactiovisual embossed means for both singly and collectively and both tactilely and visually identifying the direction to said at least one exit.

25. The exit passageway finding system of claim 21, further comprising floor-based electric illumination means for providing illumination, said illumination means being arranged along at least a portion of said at least one main aisle and in illuminative proximity to said exit passageway identifier.

26. A family of passive tactiovisual exit aids for a structure having a plurality of fixed seats arranged in rows served by at least one main aisle and at least one exit accessed from said at least one main aisle by an exit passageway, said exit passageway being flanked by at least one flanking seat of said seats, and in which said family of passive tactiovisual aids comprises at least one family member, each of said family members being tactiovisually identifiable as a member of said family of passive tactiovisual aids on the basis of tactiovisual familiarity with any other family member, said family of passive tactiovisual aids comprising:

an exit-passageway-floor-based passive tactiovisual exit passageway identifier having a plurality of passive unidirectional tactiovisual first flooring means for both singly and collectively and both tactilely and visually identifying the direction to said at least one exit and for facilitating an identification of said exit-passageway-floor-based passive tactiovisual exit passageway identifier as one family member of said family of passive tactiovisual exit aids; and at least one of (a) a main-aisle-floor-based passive tactiovisual main aisle guide strip at least a portion of which has a plurality of passive unidirectional tactiovisual second flooring means for both singly and collectively and both tactilely and visually identifying the direction to said exit passageway and for facilitating an identification of said main-aisle-floor-based passive tactiovisual main aisle guide strip portion as one family member of said family of passive tactiovisual exit aids;

(b) at least one of said seats comprising an armrest having a plurality of passive unidirectional tactiovisual first strip means for both singly and collectively and both tactilely and visually identifying the direction to said exit passageway and for facilitating an identification of said armrest as one family member of said family of passive tactiovisual exit aids;

(c) at least one of said seats comprising a side panel having a plurality of passive unidirectional tactiovisual second strip means for both singly and collectively and both tactilely and visually identifying the direction to said exit passageway and for facilitating identification of said aisle-side panel as one family member of said family of passive tactiovisual exit aids;

(d) at least one of said seats comprising a tray table having a plurality of passive tactiovisual embossed means for both singly and collectively and both tactilely and visually identifying the direction to said exit passageway and for facilitating identification of said tray table as one family member of said family of passive tactiovisual exit aids; and (e) at least a portion of said at least one exit passageway-flanking seat facing said passageway comprising upholstery having a plurality of passive unidirectional tactiovisual upholstery means for both singly and collectively and both tactilely and visually identifying the direction to said exit, and for facilitating identification of said upholstery as one family member of said family of passive tactiovisual exit aids.

27. The family of passive tactiovisual exit aids of claim 26, wherein the direction indicated by said passive unidirectional first flooring means of said exit passageway identifier and by said second flooring means of said main aisle guide strip portion is discernible through a shoe.

28. The family of passive tactiovisual exit aids of claim 26, wherein said exit passageway identifier occupies at least a portion of said main aisle adjacent to said exit passageway.

29. The family of passive tactiovisual exit aids of claim 26, wherein said passive unidirectional tactiovisual first flooring means of said exit passageway identifier comprise alternating vee-shaped strips of abrasive material and similarly shaped strips of at least one of flooring and floor-covering material arranged between adjacent ones of said vee-shaped strips of abrasive material embedded into at least one of a tactiovisually contrasting floor and tactiovisually contrasting floor-covering material.

30. The family of passive tactiovisual exit aids of claim 26, wherein at least one of said armrest, said side panel, and said tray table is selectively textured and colored to identify the direction to said exit passageway and to facilitate their identification as one family member of said family of passive tactiovisual exit aids.

31. The family of passive tactiovisual exit aids of claim 26, wherein said upholstery is a waled fabric cut and sewn to provide the passive unidirectional tactiovisual upholstery means for identifying the direction to said exit and for facilitating identification as one family member of said family of passive tactiovisual exit aids.

32. The family of passive tactiovisual exit aids of claim 26, wherein said upholstery is at least one of leather and leather-like material, selected portions of which are at least one of sueded, stiched, patched, embossed, and dyed to provide the passive unidirectional tactiovisual upholstery means for identifying the direction to said exit and for facilitating identification as one family member of said family of passive tactiovisual exit aids.

33. The family of passive tactiovisual exit aids of claim 26, further comprising floor-based electric illumination means for providing illumination and in illuminative proximity to said floor-based passive tactiovisual exit passageway identifier and said floor-based passive tactiovisual main aisle guide strip.

* * * * *

UNITED STATES PATENT AND TRADEMARK OFFICE
CERTIFICATE OF CORRECTION

PATENT NO.  : 5,331,918
DATED       : July 26, 1994
INVENTOR(S) : Richard F. Honigsbaum It is certified that error appears in the above-indentified patent and that said Letters Patent is hereby corrected as shown below:

The drawing sheet, consisting of Fig. 1, should be deleted to be replaced with the drawing sheet, consisting of Fig. 1, as shown on the attached page.

UNITED STATES PATENT AND TRADEMARK OFFICE
CERTIFICATE OF CORRECTION

PATENT NO. : 5,331,918

DATED : July 26, 1994

INVENTOR(S) : Richard F. Honigsbaum

It is certified that error appears in the above-identified patent and that said Letters Patent is hereby corrected as shown below:

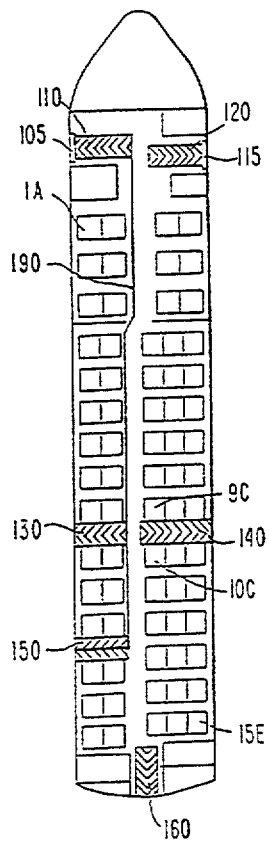

FIG. 1

UNITED STATES PATENT AND TRADEMARK OFFICE
CERTIFICATE OF CORRECTION

PATENT NO. : 5,331,918

DATED : July 26, 1994

INVENTOR(S) : Richard F. Honigsbaum

It is certified that error appears in the above-identified patent and that said Letters Patent is hereby corrected as shown below:

In the Abstract, line 2, change "tactiley" to --tactilely--.

Column 1, line 54, change "yea" to --vee--.

Column 3, line 25, change "now" to --row--.

Column 3, line 37, change "180" to --120--.

Column 3, line 44, change "spices" to --apices--.

Column 4, line 27, change "quids" to --guide--.

Column 4, line 30, change "78" to --7B--.

Column 4, line 34, change "gab" to --gap--.

Column 4, line 49, change "now" to --row--.

Column 4, line 54, change "now" to --row--.

Column 4, line 64, change "now" (both occurrences) to --row-- (both occurrences).

Column 5, line 6, change "now" to --row--.

Column 5, line 30, change "am" to --an--.

UNITED STATES PATENT AND TRADEMARK OFFICE
CERTIFICATE OF CORRECTION

PATENT NO. : 5,331,918

DATED : July 26, 1994

INVENTOR(S) : Richard F. Honigsbaum

It is certified that error appears in the above-identified patent and that said Letters Patent is hereby corrected as shown below:

Column 7, line 9, change "yes" to --vee--.

Column 7, line 31, delete "a way".

Column 7, line 52, change "pain" to --pair--.

Column 11, line 58, delete "aisle-".

Signed and Sealed this

Twenty-ninth Day of November, 1994

Attest:

BRUCE LEHMAN

Attesting Officer      Commissioner of Patents and Trademarks